United States Patent
Longhurst et al.

(10) Patent No.: US 6,915,210 B2
(45) Date of Patent: Jul. 5, 2005

(54) METHOD OF UPDATING GPS ALMANAC DATA FOR SATELLITES NOT IN VIEW

(75) Inventors: Audrey Longhurst, Seattle, WA (US); Steven Alterman, Davie, FL (US); Wayne W. Ballantyne, Coconut Creek, FL (US); Jose Korneluk, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/621,538

(22) Filed: Jul. 17, 2003

(65) Prior Publication Data

US 2005/0015200 A1 Jan. 20, 2005

(51) Int. Cl.[7] .............................................. G01S 3/02
(52) U.S. Cl. .................................. 701/213; 342/357.15
(58) Field of Search ................................. 701/213, 214, 701/215; 342/357.06, 357.09, 357.1, 357.15

(56) References Cited

U.S. PATENT DOCUMENTS

| | | | | |
|---|---|---|---|---|
| 4,445,118 A | * | 4/1984 | Taylor et al. | 342/357.09 |
| 5,999,125 A | * | 12/1999 | Kurby | 342/357.1 |
| 6,064,336 A | | 5/2000 | Krasner | |
| 6,088,694 A | * | 7/2000 | Burns et al. | 707/8 |
| 6,389,427 B1 | * | 5/2002 | Faulkner | 707/104.1 |
| 6,437,735 B1 | * | 8/2002 | McMahan | 342/357.1 |
| 6,438,382 B1 | * | 8/2002 | Boesch et al. | 455/456.6 |
| 6,453,232 B1 | * | 9/2002 | Nakamura | 701/202 |
| 6,654,686 B2 | * | 11/2003 | Kimura et al. | 701/213 |
| 6,671,620 B1 | * | 12/2003 | Garin et al. | 701/213 |
| 6,711,572 B2 | * | 3/2004 | Zakharov et al. | 707/10 |
| 6,720,915 B2 | * | 4/2004 | Sheynblat | 342/357.05 |
| 2002/0072378 A1 | * | 6/2002 | Gaal | 455/456 |

* cited by examiner

*Primary Examiner*—Michael J. Zanelli

(57) ABSTRACT

A method of updating Global Positioning System almanac data includes steps for obtaining a current satellite almanac for a satellite constellation at a server in a communications infrastructure associated with a wireless device (102), creating a subset of the current satellite almanac in the server that includes satellite almanac data only for fewer than all satellites listed in the current satellite almanac (104), and transmitting the subset of the current satellite almanac from the server to the wireless device (106).

18 Claims, 3 Drawing Sheets

METHOD OF UPDATING GPS ALMANAC DATA FOR SATELLITES NOT IN VIEW

BACKGROUND OF THE INVENTION

1. Field of the Invention

The present invention is directed to satellite navigational systems such as the Global Positioning Satellite (GPS) System. More specifically, but without limitation thereto, the present invention is directed to a method of transmitting satellite positioning data to a remote GPS receiver from a base station.

2. Description of the Prior Art

A Global Positioning System (GPS) receiver typically stores satellite almanac data for each satellite of the GPS constellation in non-volatile memory. The satellite almanac data includes low precision orbital parameters for each of the GPS satellites in the constellation for determining which satellites are in view of a GPS receiver and to calculate approximate Doppler data for the satellites in view when attempting either autonomous fixes, that is, unassisted position calculations, or assisted fixes, before ephemeris information is available. The ephemeris data includes high precision orbital parameters, typically only for the GPS satellites in the constellation that are in view. The ephemeris data ages quickly. Slowly over time, the satellite almanac data becomes stale, requiring updated information. Also, the GPS constellation may change as new satellites are brought on line and old satellites are taken out of service.

DESCRIPTION OF THE DRAWINGS

The present invention is illustrated by way of example and not limitation in the accompanying figures, in which like references indicate similar elements throughout the several views of the drawings, and in which.

Figure 1:
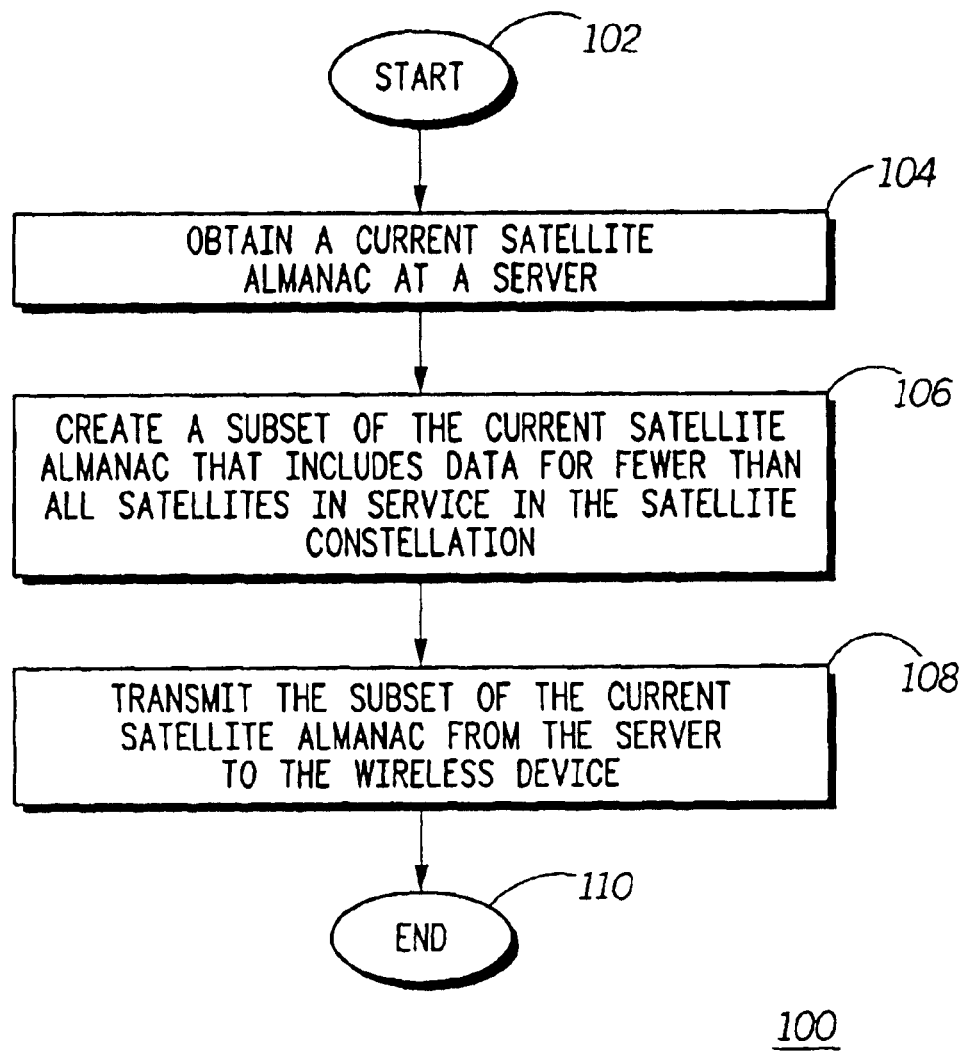
FIG. 1 illustrates a flow chart for a method of updating satellite almanac data in a wireless device according to an embodiment of the present invention.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

DESCRIPTION OF THE ILLUSTRATED EMBODIMENTS

The Global Positioning System (GPS) satellites and GPS receivers constitute a satellite navigation system. The term "Global Positioning System" and its acronym "GPS" are intended to include all satellite navigation systems in the following description of the present invention. Each satellite transmits a spread-spectrum signal with a unique pseudo-random code 1023 bits long, sent at a rate of 1.023 megabits/second determined by an onboard 10.23 MHz atomic frequency standard. Each pseudo-random code bit represents a time mark about every microsecond, corresponding to a distance of about 300 meters. The entire pseudo-random code sequence repeats once every millisecond, corresponding to a distance of 300 kilometers and is called the C/A (Coarse Acquisition) code. Every 20th cycle, or 1/50th of a second, the C/A code may change phase and is used to encode data message at a 50 bits/sec and to generate a 6000 km range marker. The 50 bps data is used to encode a 1500 bit long message which includes: the current GPS date/time and the GPS-UTC correction, high accuracy ephemeris information to locate the satellite, information on the current offset and rate errors for the atomic clock, low-accuracy satellite almanac data for all the other GPS satellites, and a crude estimate, based on solar flux, of ionospheric delay corrections.

The complete satellite almanac for the entire Global Positioning System constellation is broadcast from each of the satellites, however, updating the satellite almanac directly from the satellites requires that the GPS receiver be in clear view of at least one of the satellites. Also, the GPS receiver must be powered on for a minimum of 12.5 minutes to download the current satellite almanac data for the entire GPS constellation.

GPS satellite almanac data typically includes a description of the approximate position versus time of all satellites in the GPS constellation. Some of the parameters generally included in the GPS satellite almanac data are: Reference Week of Almanac, Eccentricity, Correction for inclination angle, Mean Anomaly at reference time, Argument of Perigee, Rate right ascension, Right ascension at reference time, Sqrt semi-major axis, Clock correction term 1, Clock correction term 2, Reference time almanac, Semi-Major Axis, Corrected Mean Motion, and Inclination angle.

The satellite almanac data may be used to derive approximate Doppler information for satellites in view. Estimating the Doppler information reduces the Doppler search time, thereby reducing total processing time substantially.

The United States GPS constellation currently consists of 28 satellites, while a full constellation requires only 24 satellites. Between four and twelve satellites may be in view from a given point on Earth at a given time, while the remainder of the GPS constellation is not in view from a given point on Earth at a given time. Because the satellite almanac data for each satellite is independent from the rest of the satellite almanac data, a subset of the satellite almanac data for one or more satellites not in view may be downloaded during an update cycle. The updated satellite almanac may be constructed piecemeal, that is, not all satellite almanac data need be downloaded in a single satellite almanac update cycle. For example, in a wireless network for providing Location Enhanced Services such as iDEN (Integrated Digital Enhanced Network), satellite almanac updates may be transmitted from a Mobile Location Center to wireless devices associated with individual subscribers. An iDEN infrastructure combines two-way digital radio, digital wireless telephone, alphanumeric messaging, data/fax capabilities, and other wireless services leveraging Internet access technology in a pocket-sized digital handset.

A GPS receiver including a communications link for downloading a satellite almanac that may be used in conjunction with embodiments of the method of the present invention is described, for example, in "GPS RECEIVER UTILIZING A COMMUNICATION LINK", U.S. Pat. No. 6,064,336 to Krasner, issued on May 16, 2000 (Krasner), incorporated herein by reference.

In one aspect of the present invention, a method of updating Global Positioning System almanac data includes steps for obtaining a current satellite almanac for a satellite constellation at a server in the communications infrastructure associated with a wireless device, creating a subset of the current satellite almanac in the server that includes satellite almanac data only for fewer than all satellites listed in the current satellite almanac, and transmitting the subset of the current satellite almanac from the server to the wireless device.

FIG. 1 illustrates a flow chart 100 for a method of updating satellite almanac data in a wireless device according to an embodiment of the present invention.

Step 102 is the entry point of the flow chart 100.

In step 104, a current satellite almanac is obtained for a satellite constellation, for example, from a server in the communications infrastructure associated with a wireless device. For example, in an iDEN infrastructure, the server may be a Mobile Location Center, and the wireless device may be a pocket-sized digital iDEN handset for performing a variety of functions coordinated through the Mobile Location Center, including a GPS receiver. The Mobile Location Center can obtain the current satellite almanac, for example, directly from a GPS receiver, that may be connected to the Internet or from Internet resources, such as the United States Coast Guard Navigation Center's website.

In step 106, a subset of the current satellite almanac is created by the server that includes data for fewer than all satellites listed in the current satellite almanac. For example, the subset of the current satellite almanac may include almanac data only for satellites that are not in view of the wireless device.

In step 108, the subset of the current satellite almanac is transmitted from the server to the wireless device over a communications channel.

Step 110 is the exit point of the flow chart 100.

The wireless device receives the subset of the current satellite almanac from the server over a communications channel and updates the current satellite almanac stored in the wireless device. Because the subset of the current satellite almanac contains less data than the entire current satellite almanac, the peak message traffic required to update the current satellite almanac in the wireless device is advantageously reduced. Further, by storing the satellite almanac in subsets, the peak message traffic capacity required for the communications infrastructure is likewise reduced.

Figure 2:
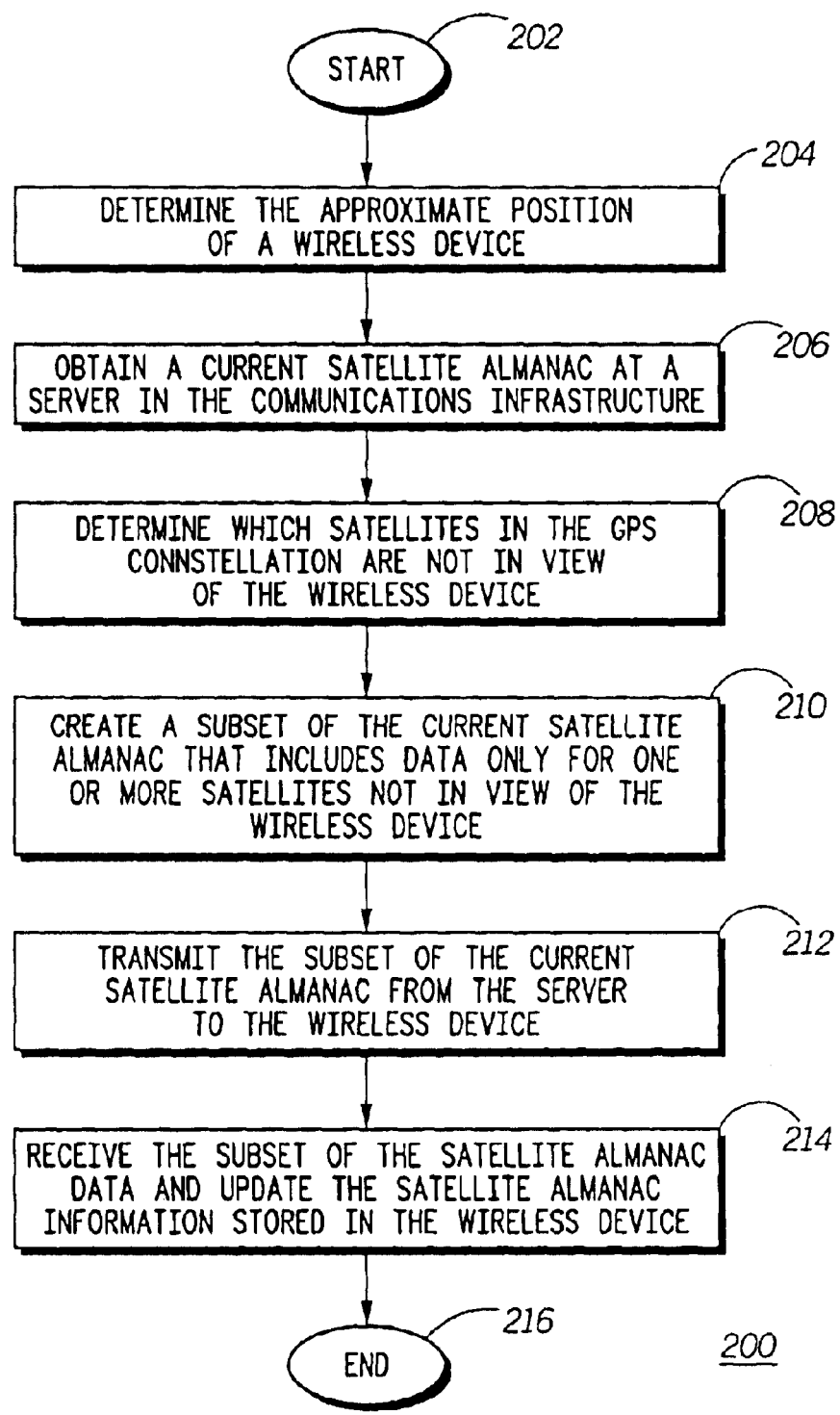
FIG. 2 illustrates a flow chart for a method of updating satellite almanac data in a wireless device for satellites not in view according to an embodiment of the present invention.

FIG. 2 illustrates a flow chart 200 for a method of updating satellite almanac data in a wireless device for satellites not in view according to an embodiment of the present invention.

Step 202 is the entry point of the flow chart 200.

In step 204, the approximate position of a wireless device is determined. For example, a cellular subscriber may transmit the approximate position of the wireless device from a previous GPS fix or from a cell latitude/longitude broadcast from the cell site. Alternatively, a server may determine a location in the communications infrastructure, that is, a cell, location-area, or grid-area, from which connection is made with the wireless device. The latitude and longitude of the location is then associated with that of the cellular subscriber.

In step 206, the current satellite almanac is obtained by a server in the communications infrastructure associated with the wireless device. For example, in an iDEN infrastructure, the current satellite almanac may be obtained by a Mobile Location Center. However, other servers and other communications infrastructures may be used to practice the present invention in various embodiments within the scope of the appended claims. The Mobile Location Center can obtain the current satellite almanac, for example, directly from a GPS receiver or from web-based resources such as the United States Coast Guard Navigation Center's website.

In step 208, the Mobile Location Center determines which satellites in the GPS constellation lie over the horizon from the approximate position of the wireless device using the current satellite almanac according to well-known techniques. Satellites that lie over the horizon are defined as being not in view, while those satellites that do not lie over the horizon are defined as being in view. However, transmissions to the wireless device from satellites in view may also be blocked by land features or buildings.

In step 210, the Mobile Location Center creates a subset of the GPS satellite almanac. The subset of the GPS satellite almanac includes data only for fewer than all satellites listed in the current satellite almanac. For example, the subset of the GPS satellite almanac data may consist of almanac data for one or more satellites that are not in view of the wireless device. In some embodiments of the present invention, satellite almanac data for one or more satellites that are not in view may be downloaded along with ephemeris data for one or more satellites that are in view.

In step 212, the Mobile Location Center transmits the subset of the satellite almanac data to the wireless device over a communications channel, for example, a cellular telephone communications channel. Because only a subset of the almanac data is transmitted with each update, the current satellite almanac stored in the wireless device may be updated in a shorter time than that required to update the entire current satellite almanac, advantageously conserving communications bandwidth.

In step 214, the wireless device receives the subset of the satellite almanac data from the Mobile Location Center and updates the current satellite almanac stored in the wireless device. Alternatively, the update may be performed on a separate copy of the current satellite almanac in the wireless device. The copy may be ping-ponged or switched to replace the current satellite almanac in the wireless device after one or more updates have been completed.

Step 216 is the exit point of the flow chart 200.

The wireless device may calculate Doppler data from the updated current satellite almanac stored in the wireless device at a convenient time for performing a navigational fix according to well known techniques.

Although the method of the present invention illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation of the present invention.

If desired, a function may be added to delete satellites that are no longer in service from the satellite almanac. For example, the Mobile Location Center may transmit a list of satellites that are no longer in service to the wireless device. Also, if an update includes satellite almanac data for all satellites not in view of the wireless device and ephemeris data for all satellites that are in view, then the satellites listed in the current satellite almanac stored in the wireless device may be compared to the satellites included in the update information. If information for every satellite in the constellation is included in either the almanac data (for satellites not in view) or in the ephemeris data (for satellites in view), then any other satellite for which information exists in the satellite almanac stored in the wireless device may be assumed to have been removed from the constellation. Because the satellite has been removed from the constellation, the corresponding satellite information may be deleted from the satellite almanac stored in the wireless device.

Figure 3:
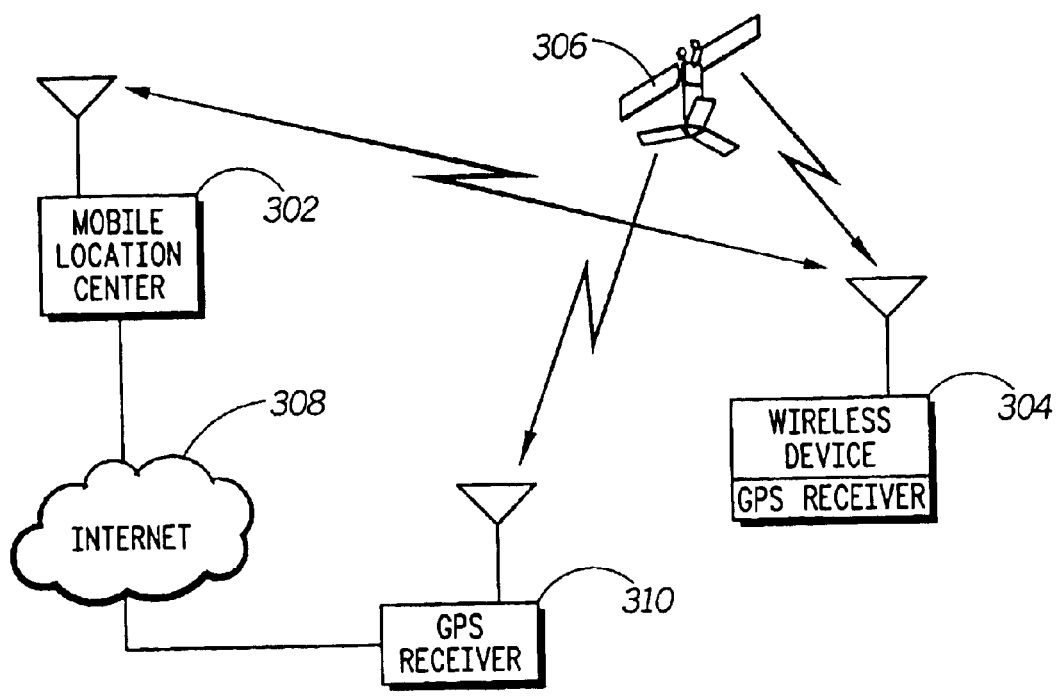
FIG. 3 illustrates a block diagram of a communications infrastructure suitable for implementing the methods illustrated in FIGS. 1 and 2.

FIG. 3 illustrates a block diagram of a communications infrastructure 300 suitable for implementing the methods illustrated in FIGS. 1 and 2. Shown in FIG. 3 are a Mobile Location Center 302, a wireless device 304, a satellite 306, a communications network 308, and a Global Positioning System receiver 310. The Mobile Location Center 302 may be implemented, for example, by a server for wireless communications. The term "server" is intended to include any device within the communications infrastructure 300 suitable for performing the functions of the Mobile Location Center 302. The wireless device 304 may be, for example, an iDEN digital handset for performing one or more functions including but not limited to two-way radio, digital wireless telephone, alphanumeric messaging, data/fax, telephone directory, voicemail, e-mail, wireless modem, and voice recording. The wireless device 304 also includes a GPS receiver for determining the location of the wireless device 304.

The communications network 308 may be, for example, the Internet. However, other types of communications networks may be used to practice various embodiments of the present invention according to well-known techniques. The GPS receiver 310 receives satellite almanac data from the Global Positioning System satellite 306 and transmits the satellite almanac data to the Mobile Location Center 302, for example, from a GPS website.

The Global Positioning System satellites have orbital periods of approximately 11 hours 58 minutes. Each of the Global Positioning System satellites lies in one of six orbital planes and move towards the West with respect to the earth at a rate of approximately one degree per day. In addition, the Earth rotates on its axis once every 24 hours.

When a Global Positioning System satellite comes into view, it may remain in view for only a brief period of time, or it may be visible for more than six hours. General rules are desirable for scheduling the transmission of updates for satellites not in view to ensure that almanac data for all of the satellites in service are updated as needed to maintain required accuracy. In one embodiment, a list of the satellites for which updated almanac data is required may be stored in the server for each subscriber including the subscriber's approximate position information. From the information stored in the list, the server can calculate the times when the satellites for which updated almanac data is required are not in view. An updated subset of the current satellite almanac may then be assembled and scheduled for transmission to the wireless device when the satellites included in the subset of the current satellite almanac are not in view.

Alternatively, heuristic rules may be used. For example, after a first subset of the current satellite almanac is transmitted, a second subset of the current satellite almanac transmitted 7 to 12 hours later will likely include all of the satellites in service that were not included in the first subset. That is, all of the satellites in view when the first subset was transmitted will likely be out of view when the second subset is transmitted.

A subset of the current satellite almanac, or update, may be requested by the subscriber when the subscriber determines that the current satellite almanac stored in the wireless device is stale, or the subscriber may request updates on a periodic basis. This mode of updating the current satellite almanac stored in the wireless device is referred to as "pull".

The server may also "push" updates to wireless devices associated with specific subscribers based on a regular schedule, a history of updates, and cellular event triggers determined by the server. The regular schedule may be determined by (a) a time frame after which a current satellite almanac is considered to be stale, (b) a time frame after which satellites in view are likely to be out of view, that is, approximately seven hours; and (c) a calculated time frame after which satellites in view will be out of view. The history of updates may be used in conjunction with the list of satellites that remain to be updated for a specific subscriber.

The cellular event triggers may include, for example, radio link control procedures such as Location Update, Handover, Reconnect, Reselect, or other operations that occur when a mobile unit moves from cell to cell. Cells are geographically grouped into Location Areas. The communications infrastructure typically only tracks a mobile unit's location to a specific Location Area. When a mobile unit enters a new cell, the communications infrastructure checks to see if the Location Area of the cell entered is the same as the Location Area of the cell exited. If the Location Area has not changed, no action is required. If the Location Area has changed, the mobile unit initiates a Location Update procedure to inform the communications infrastructure of the current Location Area. A Handover is a procedure used to change cells when the mobile unit has an active call. A Reconnect is a procedure used to change cells when the mobile unit is active during a dispatch call or a packet data session. A Reselect is a procedure used to change cells when the mobile unit is idle.

Although the method of the present invention described above refers to GPS satellites, the teachings are also applicable to positioning systems that utilize pseudolites or a combination of satellites and pseudolites. Pseudolites are pseudo satellites typically implemented as ground based transmitters that broadcast a pseudorandom code similar to a GPS signal. The pseudorandom code modulates an L-band carrier signal that is generally synchronized with GPS time. Each transmitter may be assigned a unique pseudorandom code to permit identification by a remote receiver. Pseudolites are advantageous in situations where GPS signals from an orbiting satellite are unavailable, such as in tunnels, mines, buildings or other enclosed areas. The term "satellite" as used herein is intended to include pseudolites and their equivalents. Further, other satellite positioning systems may be used to practice the present invention within the scope of the appended claims, including the Glonass system. The Glonass system differs from the GPS system primarily in that the emissions from different satellites are distinguished from one another by using slightly different carrier frequencies for each satellite rather than different pseudorandom codes.

While the invention herein disclosed has been described by means of specific embodiments and applications thereof, numerous modifications and variations may be made thereto by those skilled in the art without departing from the scope of the invention set forth in the following claims.

What is claimed is:

1. A method of updating Global Positioning System almanac data comprising steps of:

obtaining a current satellite almanac for a satellite constellation at a server in a communications infrastructure associated with a wireless device;

creating a subset of the current satellite almanac in the server that includes satellite almanac data for fewer than all satellites listed in the current satellite almanac and at least one satellite not in view of the wireless device; and transmitting the subset of the current satellite almanac from the server to the wireless device.

2. The method of claim 1 further comprising steps of receiving the subset of the current satellite almanac from the server and updating a satellite almanac stored in the wireless device with the subset of the current satellite almanac.

3. The method of claim 2 wherein the step of updating a satellite almanac stored in the wireless device comprises:

making a copy of the current satellite almanac in the wireless device;

updating the copy with the subset of the current satellite almanac; and replacing the current satellite almanac stored in the wireless device with the copy.

4. The method of claim 1 wherein the step of obtaining a current satellite almanac includes downloading the current satellite almanac from the Internet to the server.

5. The method of claim 1 wherein the step of creating a subset of the current satellite almanac in the server comprises including ephemeris data for at least one satellite in view of the wireless device.

6. A method of updating Global Positioning System almanac data comprising steps of:

determining an approximate position of a wireless device;

obtaining a current satellite almanac for a satellite constellation at a server in a communications infrastructure associated with the wireless device;

determining which satellites are not in view of the wireless device;

creating a subset of the current satellite almanac in the server that includes data only for one or more satellites not in view of the wireless device;

transmitting the subset of the current satellite almanac from the server to the wireless device;

receiving the subset of the current satellite almanac from the server at the wireless device; and updating a satellite almanac stored in the wireless device with the subset of the current satellite almanac.

7. The method of claim 6 further comprising a step of calculating Doppler data in the wireless device.

8. The method of claim 6 further comprising a step of deleting a satellite from the satellite almanac stored in the wireless device for a satellite no longer in service.

9. The method of claim 6 further comprising a step of transmitting a list of satellites no longer in service from the server to the wireless device.

10. The method of claim 6 wherein the step of creating a subset of the current satellite almanac in the server comprises including ephemeris data for satellites in view of the wireless device and ephemeris data for at least one satellite not in view of the wireless device.

11. The method of claim 6 wherein the step of obtaining a current satellite almanac includes downloading the current satellite almanac to the server from the Internet.

12. The method of claim 6 further comprising a step of requesting the server to transmit the subset of the current satellite almanac to the wireless device when the current satellite almanac stored in the wireless device is stale.

13. The method of claim 6 further comprising a step of requesting the server to transmit the subset of the current satellite almanac to the wireless device on a periodic basis.

14. The method of claim 6 further comprising a step of storing a list of satellites in the server for which updated almanac data is required for a specific subscriber including approximate position information of the wireless device associated with the specific subscriber.

15. The method of claim 14 further comprising a step of initiating the updating of the satellite almanac by the server or by the specific subscriber according to at least one of a regular schedule, a history of updates, and cellular event triggers.

16. The method of claim 15 further comprising a step of determining the regular schedule by one of a time frame after which the current satellite almanac stored in the wireless device is stale, a time frame after which satellites in view are likely to be out of view, and a calculated time frame after which satellites in view will be out of view.

17. The method of claim 15 further comprising a step of determining a time for transmitting the subset of the current satellite almanac to the wireless device by the history of updates in conjunction with the list of satellites in the server for which updated almanac data is required for the wireless device associated with the specific subscriber.

18. The method of claim 15 wherein the cellular event triggers include one of Location Update, Handover, Reconnect, and Reselect.

* * * * *